(12) United States Patent
Cheng

(10) Patent No.: US 12,307,992 B2
(45) Date of Patent: May 20, 2025

(54) DISPLAY PANEL AND DISPLAY TERMINAL

(71) Applicant: WUHAN CHINA STAR OPTOELECTRONICS TECHNOLOGY CO., LTD., Hubei (CN)

(72) Inventor: Wei Cheng, Hubei (CN)

(73) Assignee: WUHAN CHINA STAR OPTOELECTRONICS TECHNOLOGY CO., LTD., Hubei (CN)

(*) Notice: Subject to any disclaimer, the term of this patent is extended or adjusted under 35 U.S.C. 154(b) by 0 days.

(21) Appl. No.: 17/756,661

(22) PCT Filed: May 16, 2022

(86) PCT No.: PCT/CN2022/092967
§ 371 (c)(1),
(2) Date: May 30, 2022

(87) PCT Pub. No.: WO2023/201799
PCT Pub. Date: Oct. 26, 2023

(65) Prior Publication Data
US 2024/0161709 A1 May 16, 2024

(30) Foreign Application Priority Data
Apr. 19, 2022 (CN) .......................... 202210410895.0

(51) Int. Cl.
*G09G 3/36* (2006.01)
*G02F 1/13* (2006.01)
(Continued)

(52) U.S. Cl.
CPC ............. *G09G 3/36* (2013.01); *G02F 1/1323* (2013.01); *G02F 1/13338* (2013.01);
(Continued)

(58) Field of Classification Search
CPC .... G09G 3/36; G09G 2354/00; G02F 1/1323; G02F 1/13338; G02F 1/1337;
(Continued)

(56) References Cited

U.S. PATENT DOCUMENTS

2010/0091231 A1 4/2010 Nishimura

FOREIGN PATENT DOCUMENTS

| CN | 102841466 A | 12/2012 |
|---|---|---|
| CN | 106646936 A | 5/2017 |

(Continued)

OTHER PUBLICATIONS

International Search Report in International application No. PCT/CN2022/092967, mailed on Dec. 15, 2022.
(Continued)

*Primary Examiner* — Abhishek Sarma
(74) *Attorney, Agent, or Firm* — PV IP PC; Wei Te Chung

(57) ABSTRACT

The embodiment of the present disclosure is directed to a display panel. The display panel includes a first substrate, a second substrate, and a liquid crystal layer. The first substrate includes a common electrode layer and a pixel electrode layer. The second substrate comprises a control electrode layer. The liquid crystal layer is between the first substrate and the second substrate. The display panel includes a display mode and a touch mode working alternately. The display mode includes an anti-peeping mode and a sharing mode. When the display panel works in the anti-peeping mode, the control electrode layer receives a first display signal. When the display panel works in the sharing mode, the control electrode layer receives a second display signal. When the display panel works in the touch mode, the control electrode layer or the common electrode layer receives a touch driving signal.

20 Claims, 8 Drawing Sheets

(51) Int. Cl.
  *G02F 1/1333* (2006.01)
  *G02F 1/1337* (2006.01)
  *G02F 1/1343* (2006.01)
  *G06F 3/041* (2006.01)
  *G06F 3/044* (2006.01)

(52) U.S. Cl.
  CPC ...... *G02F 1/1337* (2013.01); *G02F 1/134309* (2013.01); *G06F 3/0412* (2013.01); *G06F 3/0443* (2019.05); *G06F 3/0446* (2019.05); *G09G 2354/00* (2013.01)

(58) Field of Classification Search
  CPC ............. G02F 1/134309; G02F 1/1333; G02F 2201/121; G02F 2201/123; G06F 3/0412; G06F 3/0443; G06F 3/0446; G06F 3/041
  See application file for complete search history.

(56) References Cited

FOREIGN PATENT DOCUMENTS

| CN | 106773176 A | 5/2017 |
| CN | 108508666 A | 9/2018 |
| CN | 111123562 A | 5/2020 |
| CN | 112925125 A | 6/2021 |
| CN | 113156690 A | 7/2021 |
| CN | 114153087 A | 3/2022 |
| CN | 114200704 A | 3/2022 |

OTHER PUBLICATIONS

Written Opinion of the International Search Authority in International application No. PCT/CN2022/092967, mailed on Dec. 15, 2022.

Chinese Office Action issued in corresponding Chinese Patent Application No. 202210410895.0 dated Apr. 26, 2023, pp. 1-6.

DISPLAY PANEL AND DISPLAY TERMINAL

FIELD OF THE INVENTION

The present disclosure relates to the field of display technology, more particularly, to a display panel and a display terminal.

BACKGROUND

With the progress of display technology and the iteration of electronic products, the users begin to pay more and more attention to the problem of privacy protection. On some occasions, people do not want others to see the picture displayed on the display panel, which requires that the display panel has an anti-peeping function to prevent others within the viewing angle of the display panel from seeing the picture content. The privacy display panel provides the content readability of the protected visual angle for the target user and reduces the content visibility of the off-axis position, thereby realizing the anti-peeping. The common privacy display panel is to cover a layer of anti-peeping film on the display panel, but this kind of anti-peeping film is bidirectional. If you want to realize full view anti-peeping, you need to attach two layers of orthogonal anti-peeping film, which will greatly reduce the display brightness and increase the overall thickness.

For mobile phones, tablets and laptops, there is a demand for four-way anti-peeping, left and right anti-peeping, while for vehicle-mounted displays, there is a demand for one-way anti-peeping. The prior art usually adopts the double box anti-peeping scheme, that is, in addition to the display panel, one or two additional dimming boxes are added to realize the dynamically switchable anti-peeping technology. The additional dimming box will increase the overall thickness of the display panel, which is not conducive to the realization of lightness and thinness. In addition, vehicle users also need a dynamically switchable one-way anti-peeping display panel compatible with the in-cell touch function. Therefore, there is an urgent need to provide a dynamically switchable one-way anti-peeping compatible in-cell touch single box display panel.

SUMMARY

Technical Problem

The embodiment of the present disclosure provides a display panel, which is used to solve the technical problems that the display panel of the prior art adopts an additional dimming box to realize dynamic switchable anti-peeping display, resulting in the increase of the overall thickness of the display panel, which is not conducive to the realization of lightness and thinness, and is incompatible with the in-cell touch function.

Technical Solution

The embodiment of the present disclosure provides a display panel. The display panel comprises a first substrate, a second substrate, and a liquid crystal layer. The first substrate comprises a common electrode layer and a pixel electrode layer. The second substrate is arranged opposite to the first substrate. The second substrate comprises a control electrode layer. The liquid crystal layer is between the first substrate and the second substrate. The display panel comprises a display mode and a touch mode working alternately. The display mode comprises an anti-peeping mode and a sharing mode. When the display panel works in the anti-peeping mode, the control electrode layer receives a first display signal. When the display panel works in the sharing mode, the control electrode layer receives a second display signal. When the display panel works in the touch mode, the control electrode layer or the common electrode layer receives a touch driving signal.

In some embodiments of the present disclosure, the liquid crystal layer comprises a plurality of liquid crystal molecules; when the display panel works in the anti-peeping mode, the liquid crystal molecules rotate in an inclined plane, the inclined plane is parallel to a first direction and a second direction, the first direction is inclined relative to a thickness direction of the display panel, and the second direction is perpendicular to the thickness direction of the display panel and the first direction.

In some embodiments of the present disclosure, when the display panel works in the sharing mode, the liquid crystal molecules rotate in a plane perpendicular to the thickness direction of the display panel.

In some embodiments of the present disclosure, a voltage value of the first display signal is greater than or equal to 0 V and less than or equal to 3 V, and a voltage value of the second display signal is greater than 5 V.

In some embodiments of the present disclosure, the display panel further comprises a first alignment layer between the first substrate and the liquid crystal layer, and a second alignment layer between the second substrate and the liquid crystal layer; wherein a included angle between each of the liquid crystal molecules and the first alignment layer or the second alignment layer is greater than or equal to 20 degrees and less than or equal to 80 degrees.

In some embodiments of the present disclosure, the first substrate further comprises a first lining, and the common electrode layer is between the first lining and the pixel electrode layer.

In some embodiments of the present disclosure, the first substrate further comprises a first lining, and the common electrode layer is located at one side of the pixel electrode layer away from the first lining.

In some embodiments of the present disclosure, the control electrode layer or the common electrode layer comprises a plurality of driving electrodes and a plurality of sensing electrodes that are patterned; the driving electrodes are arranged along the first direction, the sensing electrodes are arranged along the second direction, and the first direction intersects the second direction. Each of the driving electrodes receives the touch driving signal.

In some embodiments of the present disclosure, the control electrode layer or the common electrode layer comprises a plurality of touch electrodes that are patterned and arranged in array, and each of the touch electrodes receives the touch driving signal.

In some embodiments of the present disclosure, the second substrate comprises a display area and a binding area on one side of the display area, and a first driving chip is disposed in the binding area. When the display panel works in the touch mode, the control electrode layer receives the touch driving signal, and the first driving chip is used to output the first display signal, the second display signal, and the touch driving signal.

In some embodiments of the present disclosure, the first substrate comprises a display area and a binding area on one side of the display area; a second driving chip is disposed in the binding area; a conductive gold ball is disposed between the first substrate and the second substrate. When the display panel works in the touch mode, the control electrode layer receives the touch driving signal, and the second driving chip transmits the first display signal, the second display signal, and the touch driving signal to the second substrate through the conductive gold ball.

The embodiment of the present disclosure provides a display terminal. The display terminal includes a terminal body and a display panel assembled with the terminal body The display panel comprises a first substrate, a second substrate, and a liquid crystal layer. The first substrate comprises a common electrode layer and a pixel electrode layer. The second substrate is arranged opposite to the first substrate. The second substrate comprises a control electrode layer. The liquid crystal layer is between the first substrate and the second substrate. The display panel comprises a display mode and a touch mode working alternately. The display mode comprises an anti-peeping mode and a sharing mode. When the display panel works in the anti-peeping mode, the control electrode layer receives a first display signal. When the display panel works in the sharing mode, the control electrode layer receives a second display signal. When the display panel works in the touch mode, the control electrode layer or the common electrode layer receives a touch driving signal.

In some embodiments of the present disclosure, the liquid crystal layer comprises a plurality of liquid crystal molecules; when the display panel works in the anti-peeping mode, the liquid crystal molecules rotate in an inclined plane, the inclined plane is parallel to a first direction and a second direction, the first direction is inclined relative to a thickness direction of the display panel, and the second direction is perpendicular to the thickness direction of the display panel and the first direction.

In some embodiments of the present disclosure, when the display panel works in the sharing mode, the liquid crystal molecules rotate in a plane perpendicular to the thickness direction of the display panel.

In some embodiments of the present disclosure, a voltage value of the first display signal is greater than or equal to 0 V and less than or equal to 3 V, and a voltage value of the second display signal is greater than 5 V.

In some embodiments of the present disclosure, the display panel further comprises a first alignment layer between the first substrate and the liquid crystal layer, and a second alignment layer between the second substrate and the liquid crystal layer. An included angle between each of the liquid crystal molecules and the first alignment layer or the second alignment layer is greater than or equal to 20 degrees and less than or equal to 80 degrees.

In some embodiments of the present disclosure, the control electrode layer or the common electrode layer comprises a plurality of driving electrodes and a plurality of sensing electrodes that are patterned; the driving electrodes are arranged along the first direction, the sensing electrodes are arranged along the second direction, and the first direction intersects the second direction. Each of the driving electrodes receives the touch driving signal.

In some embodiments of the present disclosure, the control electrode layer or the common electrode layer comprises a plurality of touch electrodes that are patterned and arranged in array, and each of the touch electrodes receives the touch driving signal.

In some embodiments of the present disclosure, the second substrate comprises a display area and a binding area on one side of the display area, and a first driving chip is disposed in the binding area. When the display panel works in the touch mode, the control electrode layer receives the touch driving signal, and the first driving chip is used to output the first display signal, the second display signal, and the touch driving signal.

In some embodiments of the present disclosure, the first substrate comprises a display area and a binding area on one side of the display area; a second driving chip is disposed in the binding area; a conductive gold ball is disposed between the first substrate and the second substrate. When the display panel works in the touch mode, the control electrode layer receives the touch driving signal, and the second driving chip transmits the first display signal, the second display signal, and the touch driving signal to the second substrate through the conductive gold ball.

Advantageous Effect

In conclusion, the embodiment of the present disclosure is directed to a display panel. The display panel includes a first substrate, a second substrate, and a liquid crystal layer. The first substrate includes a common electrode layer and a pixel electrode layer. The second substrate comprises a control electrode layer. The liquid crystal layer is between the first substrate and the second substrate. The display panel includes a display mode and a touch mode working alternately. The display mode includes an anti-peeping mode and a sharing mode. When the display panel works in the anti-peeping mode, the control electrode layer receives a first display signal. When the display panel works in the sharing mode, the control electrode layer receives a second display signal. When the display panel works in the touch mode, the control electrode layer or the common electrode layer receives a touch driving signal. The present disclosure makes the display panel compatible with the in-cell touch function by multiplexing the control electrode layer or the common electrode layer into a touch electrode layer. By controlling the electric field formed between the control electrode layer, the common electrode layer, and the pixel electrode layer to control the liquid crystal layer, the switching between the one-way anti-peeping mode and the sharing mode can be realized without setting an additional dimming box to avoid the increase of the overall thickness of the display panel, which is conducive to the realization of lightweight and low cost.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF THE EMBODIMENTS

Figure 1:
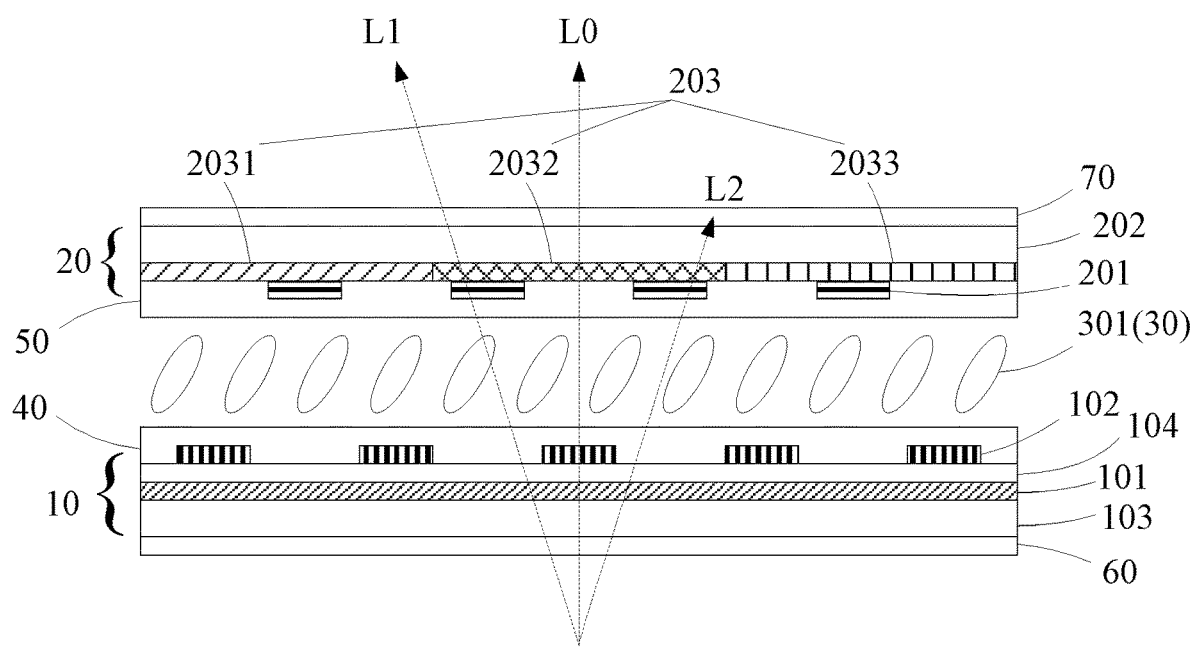
FIG. 1 is a structural diagram of a display panel according to an embodiment of the present disclosure.

The technical solution in the embodiment of the present disclosure in conjunction to the accompanying drawings is clearly and completely described. In the drawings, in order to be clear and easy to understand and describe, the dimensions and thicknesses of the components depicted in the drawings are not proportional.

Figure 2:
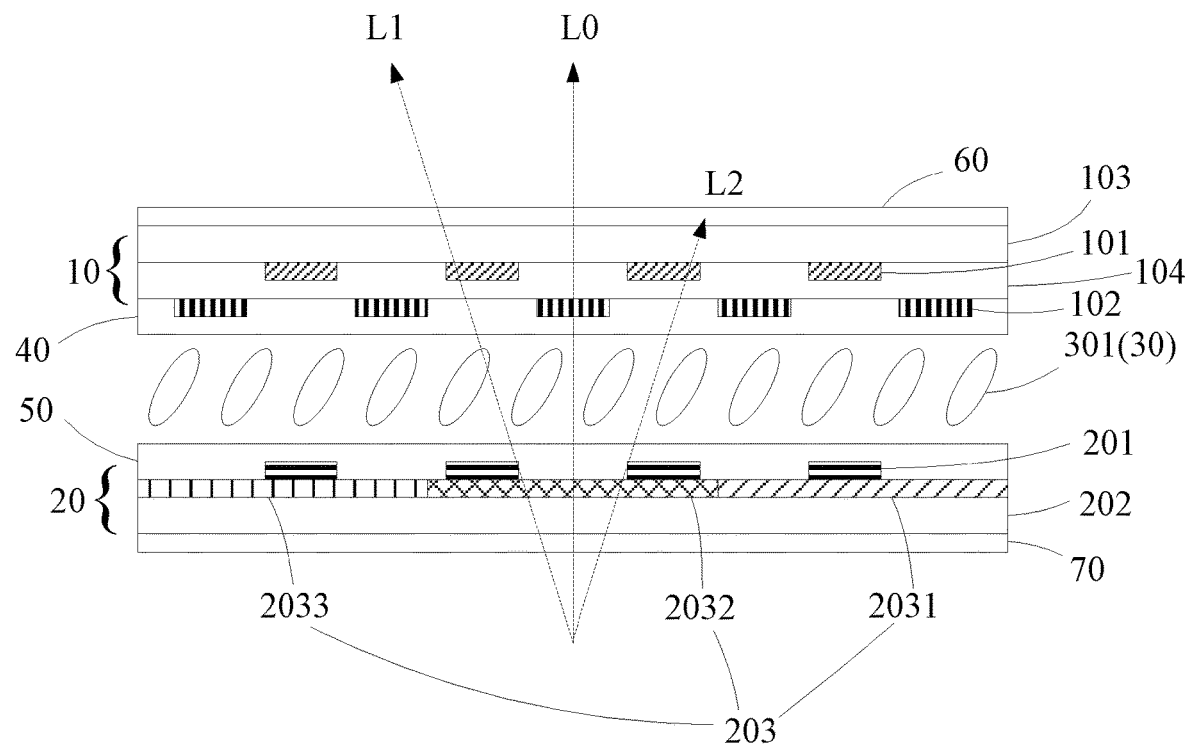
FIG. 2 is a structural diagram of another display panel according to an embodiment of the present disclosure.

As shown in FIG. 1 and FIG. 2, FIG. 1 is a structural diagram of a display panel according to an embodiment of the present disclosure, and FIG. 2 is a structural diagram of another display panel according to an embodiment of the present disclosure, respectively. The display panel comprises a first substrate 10, a second substrate 20, and a liquid crystal layer 30. The first substrate 10 comprises a common electrode layer 101 and a pixel electrode layer 102. The second substrate 20 is arranged opposite to the first substrate 10. The second substrate 20 comprises a control electrode layer 201. The liquid crystal layer 30 is between the first substrate 10 and the second substrate 20. The display panel comprises a display mode and a touch mode working alternately. The display mode comprises an anti-peeping mode and a sharing mode. When the display panel works in the anti-peeping mode, the control electrode layer 201 receives a first display signal. When the display panel works in the sharing mode, the control electrode layer 201 receives a second display signal. When the display panel works in the touch mode, the control electrode layer 201 or the common electrode layer 101 receives a touch driving signal.

FIG. 1 illustrates that the control electrode layer 201 is patterned and multiplexed into a touch electrode layer. When the display panel works in the touch mode, the control electrode layer 201 receives the touch driving signal. The common electrode layer 101 may be set in a whole layer or patterned. FIG. 1 illustrates only the whole layer setting of the common electrode layer 101 as an example. In addition, when the control electrode layer 201 is multiplexed into a touch electrode layer, the second substrate 20 is arranged on one side close to the light exit side of the display panel. FIG. 2 illustrates that the common electrode layer 101 is patterned and multiplexed into a touch electrode layer. When the display panel works in the touch mode, the common electrode layer 101 receives the touch driving signal. The control electrode layer 201 may be patterned or set in a whole layer. FIG. 2 illustrates only the patterned setting of the control electrode layer 201 as an example. In addition, when the common electrode layer 101 is multiplexed into a touch electrode layer, the first substrate 10 is arranged on one side close to the light exit side of the display panel.

Figure 3:
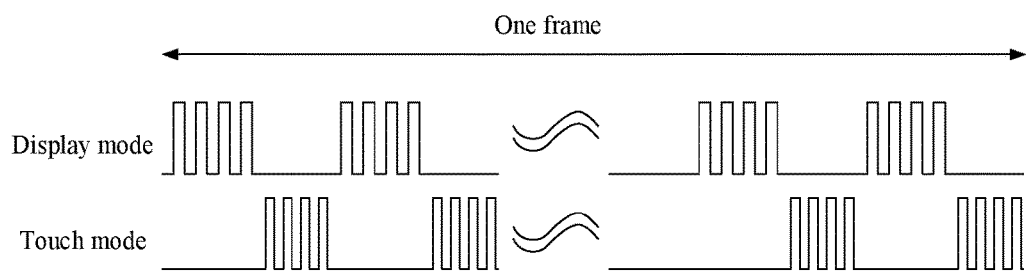
FIG. 3 is a timing diagram of a display mode and a touch mode according to an embodiment of the present disclosure.

The display panel comprises a display mode and a touch mode working alternately. As shown in FIG. 3, FIG. 3 is a timing diagram of a display mode and a touch mode according to an embodiment of the present disclosure. Wherein a frame is about 16 milliseconds. The control electrode layer or the common electrode layer is time-division multiplexed, and the signal of the display mode and the signal of the touch mode are alternately input. Wherein the response time of liquid crystal is a millisecond and the scanning time of touch is a microsecond. Due to the time difference between the two, the time of scoring in the signal of the touch mode accounts for a very short part of a frame, and the signal of the touch mode is scanned with a small voltage (greater than 0 V and less than or equal to 3 V), so it will not interfere with the display mode.

In the prior art, an additional dimming box is usually set on the display panel to realize the dynamic switchable anti-peeping effect, but the additional dimming box will increase the overall thickness of the display panel, which is not conducive to the realization of lightness and thinness, and is incompatible with the in-cell touch function. In the present disclosure, the control electrode layer 201 or the common electrode layer 101 is multiplexed into a touch electrode layer to make the display panel compatible with the in-cell touch function. By controlling the electric field formed between the control electrode layer 201, the common electrode layer 101, and the pixel electrode layer 102 to control the liquid crystal layer 30, the switching between the one-way anti-peeping mode and the sharing mode can be realized without setting an additional dimming box to avoid the increase of the overall thickness of the display panel, which is conducive to the realization of lightweight and low cost. In addition, it should be also noted that the embodiment of the present disclosure is unidirectional anti-peeping when equipped with a symmetrical backlight. When equipped with a switchable one-way anti-peeping backlight, the switching of two-way anti-peeping mode and sharing mode can be realized.

The liquid crystal layer 30 comprises a plurality of liquid crystal molecules 301. When the display panel works in the anti-peeping mode, the liquid crystal molecules 301 rotate in an inclined plane, the inclined plane is parallel to a first direction and a second direction, the first direction is inclined relative to a thickness direction of the display panel, and the second direction is perpendicular to the thickness direction of the display panel and the first direction.

Figure 4:
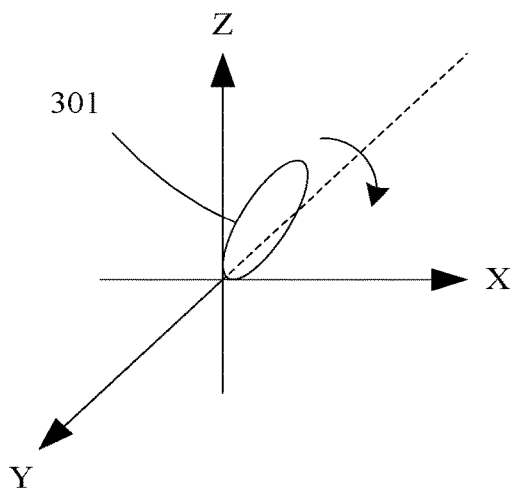
FIG. 4 is a schematic diagram of the rotation direction of liquid crystal molecules in the anti-peeping mode according to an embodiment of the present disclosure.

As shown in FIG. 4, FIG. 4 is a schematic diagram of the rotation direction of liquid crystal molecules in the anti-peeping mode according to an embodiment of the present disclosure. Wherein the thickness direction of the display panel is the Z direction, the second direction is the Y direction, the first direction is located in the X-Z plane, and the first direction is inclined relative to the Z direction. That is, an included angle is between the first direction and the Z direction, and the included angle is greater than 0 degree and less than 90 degrees. The inclined plane is a plane defined by the first direction and the second direction. That is, a certain included angle is also formed between the inclined plane and the Y-Z plane, and the included angle between the inclined plane and the Y-Z plane is equal to the included angle between the first direction and the Z direction.

The first electric field formed between the pixel electrode layer and the common electrode layer is distributed along the X-Y plane, so that the liquid crystal molecule 301 rotates in the X-Y plane driven by the first electric field. The second electric field formed between the control electrode layer, the common electrode layer and the pixel electrode layer is distributed along the Z plane, so that the liquid crystal molecule 301 forms a certain included angle with the X-Y plane driven by the second electric field. Therefore, driven by the first electric field and the second electric field, the liquid crystal molecule 301 rotates in an inclined plane with a certain angle with the X-Y plane.

Taking the rotation of the liquid crystal molecules 301 in an inclined plane inclined to the right from the X-Y plane as an example, it can be seen from FIG. 1 and FIG. 2 that the light L0 and L1 emitted from the bottom of the display panel can be emitted, but L2 cannot be emitted. This is because the emission direction of L2 is parallel to the long axis direction of the liquid crystal molecules 301 and cannot pass through the second polarizer 70 (absorbed by the second polarizer 70) without delay. Therefore, the observation position on the right (L2 side) cannot see the picture displayed on the display panel, so the effect of one-way anti-peeping can be realized.

Figure 5:
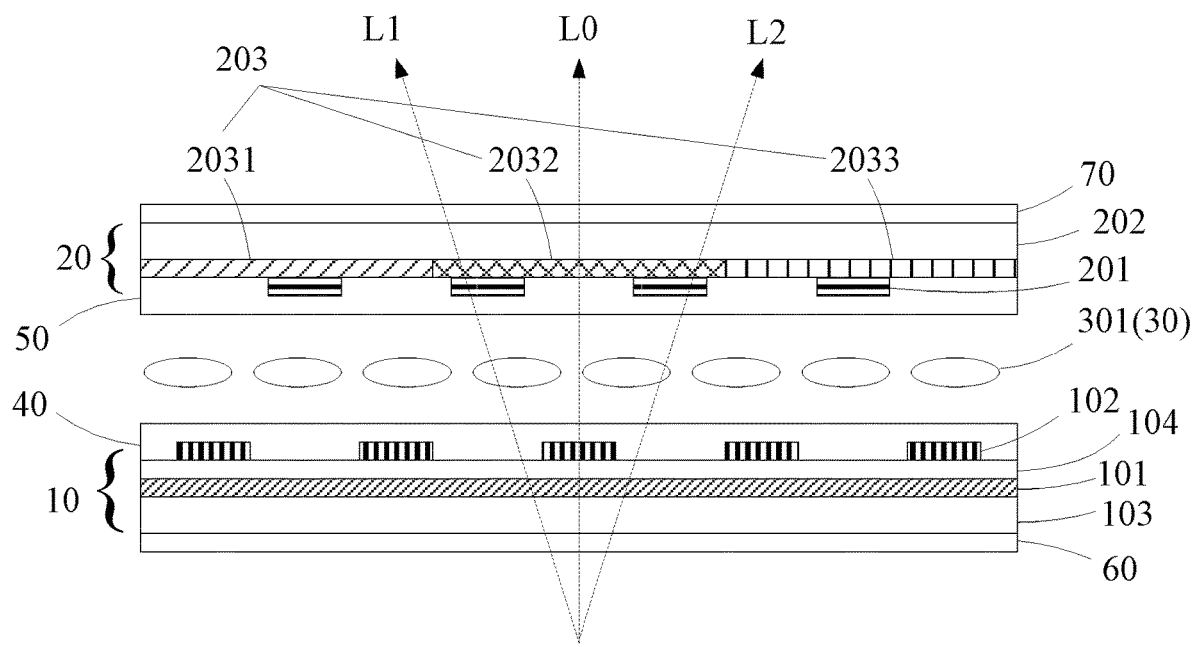
FIG. 5 is a schematic diagram when the display panel works in a sharing mode according to an embodiment of the present disclosure.
Figure 6:
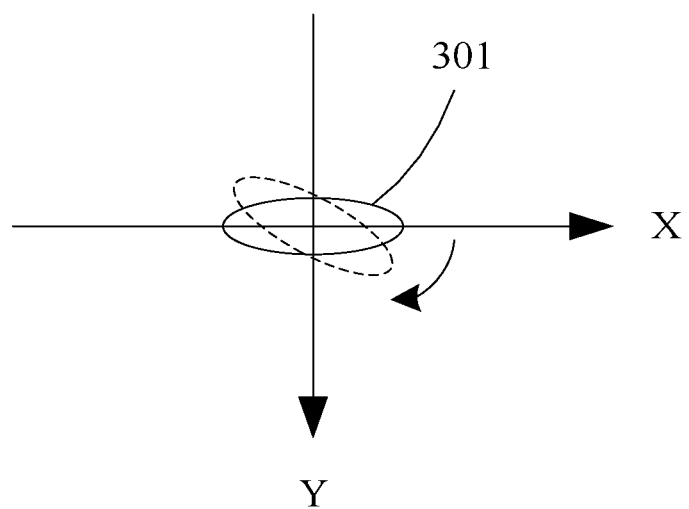
FIG. 6 is a schematic diagram of the rotation direction of liquid crystal molecules in the sharing mode according to an embodiment of the present disclosure.

The liquid crystal molecules 301 are negative liquid crystal. When the control electrode layer 201 receives the first display signal (low voltage), the liquid crystal molecules 301 rotate in an inclined plane forming a certain included angle with the X-Y plane, which can realize the effect of one-way anti-peeping, that is the anti-peeping mode. When the control electrode layer 201 receives the second display signal (high voltage), the liquid crystal molecules 301 are dumped under the action of the second electric field (as shown in FIG. 5, FIG. 5 is a schematic diagram when the display panel works in a sharing mode according to an embodiment of the present disclosure), and rotate in the X-Y plane under the action of the first electric field (as shown in FIG. 6, FIG. 6 is a schematic diagram of the rotation direction of liquid crystal molecules in the sharing mode according to an embodiment of the present disclosure). That is, when the display panel works in the sharing mode, the liquid crystal molecules 301 rotate in a plane (X-Y plane) perpendicular to the thickness direction of the display panel (Z direction). At this time, the light L0, L1, and L2 emitted from the bottom of the display panel can be emitted, that is the sharing mode.

The voltage value of the first display signal is greater than or equal to 0 V and less than or equal to 3 V, and the voltage value of the second display signal is greater than 5 V.

Please refer to FIG. 1 and FIG. 2, the display panel further comprises a first alignment layer 40 and a second alignment layer 50. The first alignment layer 40 is between the first substrate 10 and the liquid crystal layer 30. The second alignment layer 50 is between the second substrate 20 and the liquid crystal layer 30. A included angle between each of the liquid crystal molecules 301 and the first alignment layer 40 or the second alignment layer 50 is greater than or equal to 20 degrees and less than or equal to 80 degrees.

When the voltage value of the control electrode layer 201 is 0, since the first alignment layer 40 and the second alignment layer 50 of this embodiment make the liquid crystal molecules 301 have a pretilt angle and is capable of rotating in the inclined plane formed by the pretilt angle, the effect of unidirectional anti-peeping can also be realized.

Specifically, when the voltage value of the control electrode layer 201 is 0, that is, when the second electric field does not exist, the liquid crystal molecules 301 realize unidirectional anti-peeping by relying on the pretilt angle formed by the first alignment layer 40 and the second alignment layer 50. When the voltage value of the control electrode layer 201 is greater than 0 and less than or equal to 3 V, that is, when the second electric field exists, the long axis of the liquid crystal molecules 301 (negative liquid crystal) rotates in a direction perpendicular to the second electric field, so it can be used as a help to maintain the pretilt angle in the anti-peeping mode. When the voltage value of the control electrode layer 201 is greater than 5 V, the long axis of the liquid crystal molecules 301 (negative liquid crystal) is perpendicular to the direction of the second electric field (as shown in FIG. 5). At this time, the rotation angle of the liquid crystal molecules 301 is adjusted by the first electric field between the pixel electrode layer 102 and the common electrode layer 101 on the side of the first substrate 10 (as shown in FIG. 6).

The first alignment layer 40 and the second alignment layer 50 can be light alignment or friction alignment. It is necessary to obtain a large pretilt angle (the range of the angle is between 20 degrees to 80 degrees, such as 45 degrees) under light or by friction. The degree of the pretilt angle determines the visual angle and anti-peeping angle in the anti-peeping mode. In addition, due to different side viewing angles and cell thicknesses, the required alignment angle will also be different. That is, the degree of the pretilt angle is related to liquid crystal refractive index, cell thickness and viewing angle.

The first substrate 10 also comprises a first lining 103 and an insulating layer 104 arranged between the common electrode layer 101 and the pixel electrode layer 102. The second substrate 20 also comprises a second lining 202 and a color resistance layer 203 arranged between the second lining 202 and the control electrode layer 201. The color resistance layer 203 comprises a red color resistance 2031, a green color resistance 2032, and a blue color resistance 2033. The first lining 103 and the second lining 202 are ordinary glass or flexible substrates such as PET, TAC, and CPI. The display panel further comprises a first polarizer 60 located on the side of the first substrate 10 away from the liquid crystal layer 30.

The common electrode layer 101 may be located between the first lining 103 and the pixel electrode layer 102, and the common electrode layer 101 may be also located on the side of the pixel electrode layer 102 away from the first lining 103.

In one embodiment, the material of the control electrode layer 201 is indium tin oxide or zinc oxide. It can be understood that since the control electrode layer 201 or the common electrode layer 101 is multiplexed into a touch electrode layer, the touch electrode layer needs to be patterned, that is, the control electrode layer 201 or the common electrode layer 101 needs to be patterned.

Figure 7:
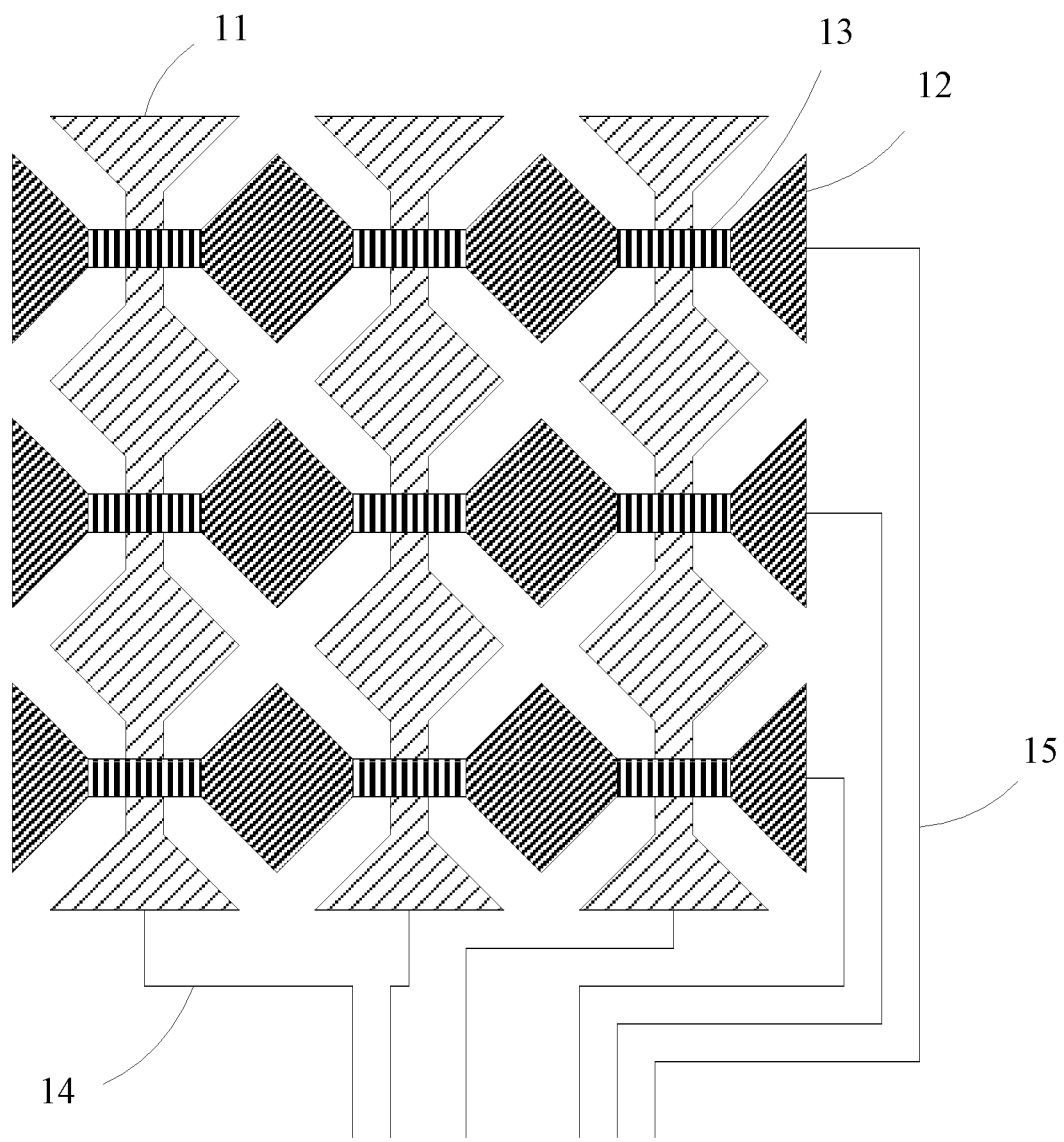
FIG. 7 is a structural diagram of a touch electrode layer according to an embodiment of the present disclosure.
Figure 8:
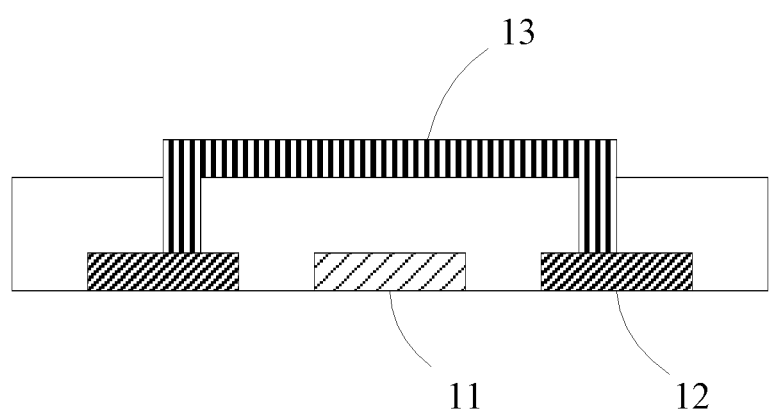
FIG. 8 is a sectional view of the driving electrodes and the sensing electrodes in FIG. 7.

As shown in FIG. 7 and FIG. 8, FIG. 7 is a structural diagram of a touch electrode layer according to an embodiment of the present disclosure, FIG. 8 is a sectional view of the driving electrodes and the sensing electrodes in FIG. 7, respectively. In this embodiment, the control electrode layer 201 or the common electrode layer 101 comprises a plurality of driving electrodes 11 and a plurality of sensing electrodes 12, the driving electrodes 11 and the sensing electrodes 12 are patterned. The driving electrodes 11 are arranged along the first direction (vertical). The sensing electrodes 12 are arranged along the second direction (lateral). The first direction intersects the second direction. Wherein each of the driving electrodes 11 receives the touch driving signal.

As shown in FIG. 8, the driving electrode 11 and the sensing electrodes 12 are arranged on the same layer, and the two adjacent sensing electrodes 12 are electrically connected through the connecting electrode 13. As shown in FIG. 7, the touch driving signal is transmitted to the driving electrodes 11 through the first touch wires 14, the driving electrodes 11 transmits electrical signals, and the sensing electrodes 12 receive the electrical signals transmitted by the driving electrodes 11 and transmit them back to the main controller through the second touch wires 15 (not shown in this figure). When a finger touches, part of the electrical signals transmitted by the driving electrodes 11 are transmitted back to the earth through the finger, and the other part received by the sensing electrodes 12. Therefore, when a finger touches, the electrical signals received by the sensing electrodes 12 become weaker, and the touch detection can be realized.

Figure 9:
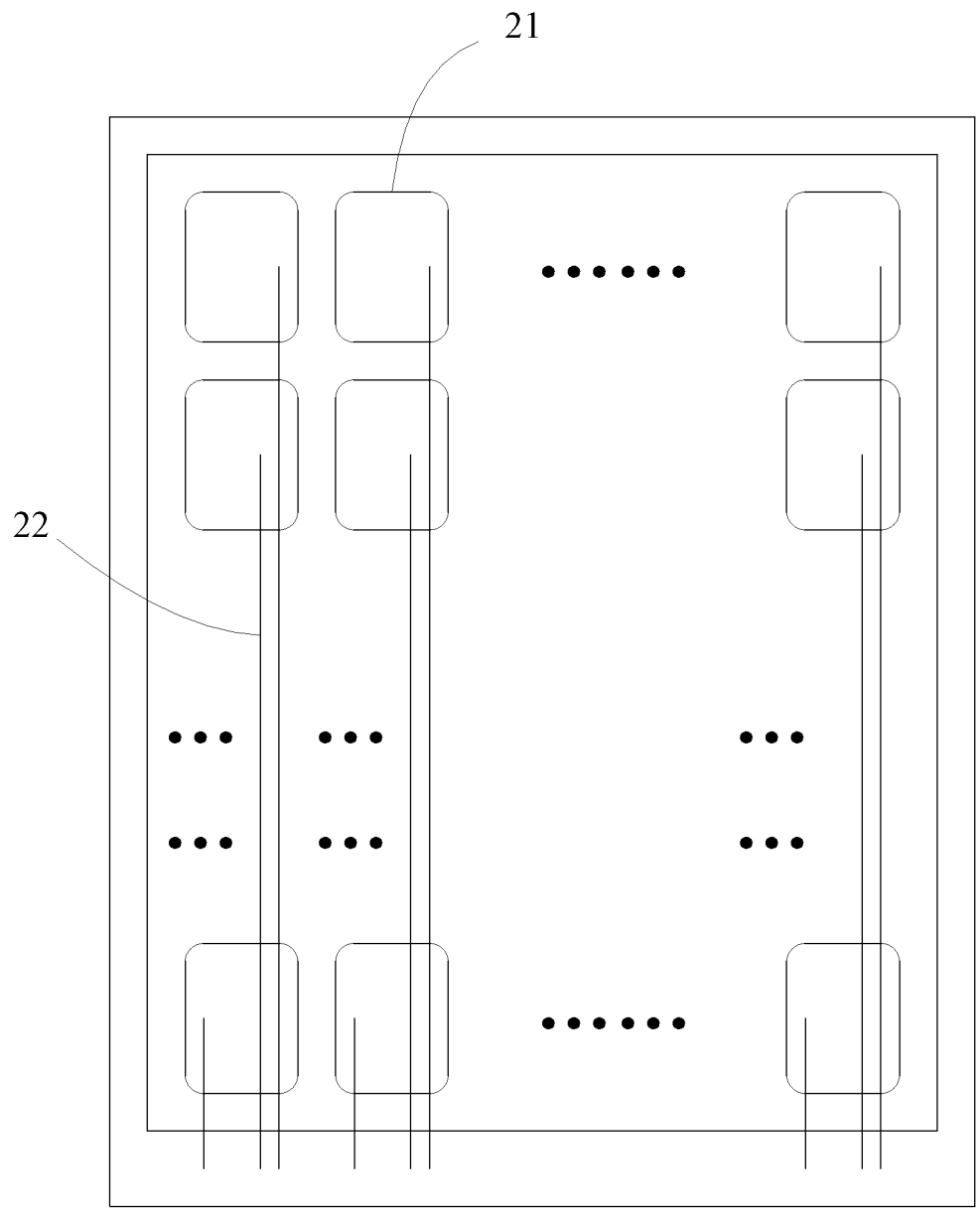
FIG. 9 is a structural diagram of another touch electrode layer according to an embodiment of the present disclosure.

Please refer to FIG. 9, FIG. 9 is a structural diagram of another touch electrode layer according to an embodiment of the present disclosure. The control electrode layer 201 or the common electrode layer 101 comprises a plurality of touch electrodes 21. The touch electrodes are patterned. The touch electrodes 21 are arranged in an array. Each of the touch electrodes 21 receives the touch driving signal.

FIG. 9 illustrates a self-capacitive touch. The touch driving signals are transmitted to the touch electrodes 21 through the touch wires 22 and back to the main controller through the touch wires 22 (not shown in this figure). When a finger touches, a capacitance is formed between the finger and the touch electrodes 21, so that the electric capacity after touching becomes stronger, so that touch detection can be realized.

Figure 10:
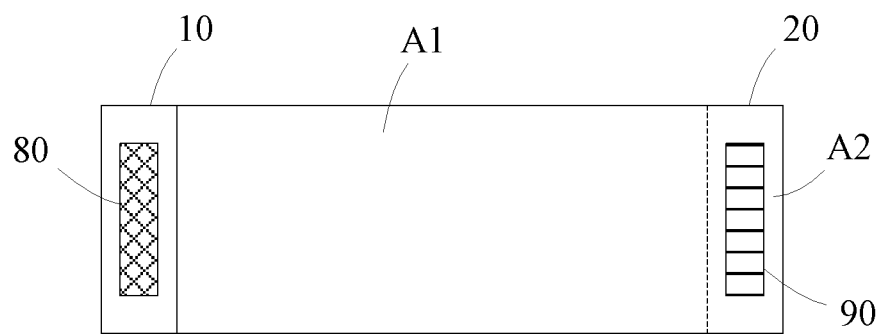
FIG. 10 is a top view of a display panel according to an embodiment of the present disclosure.

Please refer to FIG. 10, FIG. 10 is a top view of a display panel according to an embodiment of the present disclosure. The second substrate 20 comprises a display area A1 and a binding area A2 on one side of the display area A1. A first driving chip 90 is disposed in the binding area A2. When the display panel works in the touch mode, the control electrode layer receives the touch driving signal. The first driving chip 90 is used to output the first display signal, the second display signal, and the touch driving signal.

When the control electrode layer is multiplexed into a touch electrode layer, since the second substrate 20 is provided with the first driving chip 90, the first driving chip 90 on the side of the second substrate 20 is used to output the first display signal, the second display signal, and the touch driving signal to the control electrode layer. The second driving chip 80 on the side of the first substrate 10 is used to output signal to the pixel electrode layer and the common electrode layer. When the common electrode layer is multiplexed into a touch electrode layer, the first driving chip 90 on the side of the second substrate 20 is used to output the first display signal and the second display signal to the control electrode layer, and the second driving chip 80 on the side of the first substrate 10 is used to output the touch driving signal to the common electrode layer.

Figure 11:
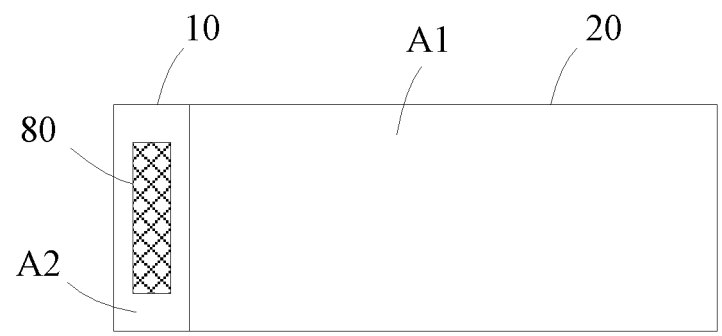
FIG. 11 is a top view of another display panel according to an embodiment of the present disclosure.

Please refer to FIG. 11, FIG. 11 is a top view of another display panel according to an embodiment of the present disclosure. The first substrate 10 comprises a display area A1 and a binding area A2 on one side of the display area A1. A second driving chip 80 is disposed in the binding area A2, and a conductive gold ball (not shown in this figure) is disposed between the first substrate 10 and the second substrate 20. When the display panel works in the touch mode, the control electrode layer receives the touch driving signal, and the second driving chip 80 transmits the first display signal, the second display signal, and the touch driving signal to the second substrate 20 through the conductive gold ball.

In this embodiment, the first driving chip 90 (as shown in FIG. 10) is not additionally set on the side of the second substrate 20. Therefore, one driving chip can be saved. The signal required for the control electrode layer on the side of the second substrate 20 is transmitted by the second driving chip 80 on the side of the first substrate 10 through the conductive golden ball.

The embodiment of the present disclosure also provides a display terminal. The display terminal comprises a terminal body and the display panel as described above. The terminal body is combined into one with the display panel. For the basic structure of the display panel, please refer to FIGS. 1 to 11 and the relevant descriptions, which will not be repeated here. The display terminal of the embodiment of the present disclosure may be: mobile phone, tablet, laptop, TV, digital camera, navigator, and other products or components with display function.

To sum up, the embodiment of the present disclosure is directed to a display panel. The display panel includes a first substrate, a second substrate, and a liquid crystal layer. The first substrate includes a common electrode layer and a pixel electrode layer. The second substrate comprises a control electrode layer. The liquid crystal layer is between the first substrate and the second substrate. The display panel includes a display mode and a touch mode working alternately. The display mode includes an anti-peeping mode and a sharing mode. When the display panel works in the anti-peeping mode, the control electrode layer receives a first display signal. When the display panel works in the sharing mode, the control electrode layer receives a second display signal. When the display panel works in the touch mode, the control electrode layer or the common electrode layer receives a touch driving signal. The present disclosure makes the display panel compatible with the in-cell touch function by multiplexing the control electrode layer or the common electrode layer into a touch electrode layer. By controlling the electric field formed between the control electrode layer, the common electrode layer, and the pixel electrode layer to control the liquid crystal layer, the switching between the one-way anti-peeping mode and the sharing mode can be realized without setting an additional dimming box to avoid the increase of the overall thickness of the display panel, which is conducive to the realization of lightweight and low cost.

The embodiments of the present disclosure are directed to a display panel and display terminal. It should be understood that the exemplary embodiments described herein should be considered descriptive only, for helping to understand the present disclosure and its core ideas, and not to limit the present disclosure.

What is claimed is:

1. A display panel, comprising:
a first substrate, comprising a common electrode layer and a pixel electrode layer;
a second substrate, arranged opposite to the first substrate and provided with a control electrode layer; and
a liquid crystal layer, sandwiched between the first substrate and the second substrate;
wherein a display mode and a touch mode alternately are operated by the display panel; the display mode comprises an anti-peeping mode and a sharing mode, and the control electrode layer receives a first display signal when the display panel operates in the anti-peeping mode; when the display panel works in the sharing mode, the control electrode layer receives a second display signal; when the display panel works in the touch mode, the control electrode layer or the common electrode layer receives a touch driving signal; and
the common electrode layer or the control electrode layer is reused as a touch electrode layer.

2. The display panel as claimed in claim 1, wherein the liquid crystal layer comprises a plurality of liquid crystal molecules; when the display panel works in the anti-peeping mode, the liquid crystal molecules rotate in an inclined plane, the inclined plane is parallel to a first direction and a second direction, the first direction is inclined relative to a thickness direction of the display panel, and the second direction is perpendicular to the thickness direction of the display panel and the first direction.

3. The display panel as claimed in claim 2, wherein when the display panel works in the sharing mode, the liquid crystal molecules rotate in a plane perpendicular to the thickness direction of the display panel.

4. The display panel as claimed in claim 3, wherein a voltage value of the first display signal is greater than or equal to 0 V and less than or equal to 3 V, and a voltage value of the second display signal is greater than 5 V.

5. The display panel as claimed in claim 4, wherein the display panel further comprises a first alignment layer between the first substrate and the liquid crystal layer, and a second alignment layer between the second substrate and the liquid crystal layer; wherein an included angle between each of the liquid crystal molecules and the first alignment layer or the second alignment layer is greater than or equal to 20 degrees and less than or equal to 80 degrees.

6. The display panel as claimed in claim 1, wherein the first substrate further comprises a first lining, and the common electrode layer is between the first lining and the pixel electrode layer.

7. The display panel as claimed in claim 1, wherein the first substrate further comprises a first lining, and the common electrode layer is located at one side of the pixel electrode layer away from the first lining.

8. The display panel as claimed in claim 1, wherein the control electrode layer or the common electrode layer comprises a plurality of driving electrodes and a plurality of sensing electrodes that are patterned; the driving electrodes are arranged along a first direction, the sensing electrodes are arranged along the second direction, and the first direction intersects a second direction;
wherein each of the driving electrodes receives the touch driving signal.

9. The display panel as claimed in claim 1, wherein the control electrode layer or the common electrode layer comprises a plurality of touch electrodes that are patterned and arranged in array, and each of the touch electrodes receives the touch driving signal.

10. The display panel as claimed in claim 1, wherein the second substrate comprises a display area and a binding area on one side of the display area, and a first driving chip is disposed in the binding area;
wherein when the display panel works in the touch mode, the control electrode layer receives the touch driving signal, and the first driving chip is used to output the first display signal, the second display signal, and the touch driving signal.

11. The display panel as claimed in claim 1, wherein the first substrate comprises a display area and a binding area on one side of the display area; a second driving chip is disposed in the binding area; a conductive gold ball is disposed between the first substrate and the second substrate; and
wherein when the display panel works in the touch mode, the control electrode layer receives the touch driving signal, and the second driving chip transmits the first display signal, the second display signal, and the touch driving signal to the second substrate through the conductive gold ball.

12. A display terminal, comprising a terminal body and a display panel assembled with the terminal body, the display panel comprising:
a first substrate, comprising a common electrode layer and a pixel electrode layer;
a second substrate, arranged opposite to the first substrate and provided with a control electrode layer; and
a liquid crystal layer, sandwiched between the first substrate and the second substrate;
wherein a display mode and a touch mode alternately are operated by the display panel; the display mode comprises an anti-peeping mode and a sharing mode, and the control electrode layer receives a first display signal when the display panel operates in the anti-peeping mode; when the display panel works in the sharing mode, the control electrode layer receives a second display signal; when the display panel works in the touch mode, the control electrode layer or the common electrode layer receives a touch driving signal; and
the common electrode layer or the control electrode layer is reused as a touch electrode layer.

13. The display terminal as claimed in claim 12, wherein the liquid crystal layer comprises a plurality of liquid crystal molecules; when the display panel works in the anti-peeping mode, the liquid crystal molecules rotate in an inclined plane, the inclined plane is parallel to a first direction and a second direction, the first direction is inclined relative to a thickness direction of the display panel, and the second direction is perpendicular to the thickness direction of the display panel and the first direction.

14. The display terminal as claimed in claim 13, wherein when the display panel works in the sharing mode, the liquid crystal molecules rotate in a plane perpendicular to the thickness direction of the display panel.

15. The display terminal as claimed in claim 14, wherein a voltage value of the first display signal is greater than or equal to 0 V and less than or equal to 3 V, and a voltage value of the second display signal is greater than 5 V.

16. The display terminal as claimed in claim 15, wherein the display panel further comprises a first alignment layer between the first substrate and the liquid crystal layer, and a second alignment layer between the second substrate and the liquid crystal layer; wherein an included angle between each of the liquid crystal molecules and the first alignment layer or the second alignment layer is greater than or equal to 20 degrees and less than or equal to 80 degrees.

17. The display terminal as claimed in claim 12, wherein the control electrode layer or the common electrode layer comprises a plurality of driving electrodes and a plurality of sensing electrodes that are patterned; the driving electrodes are arranged along a first direction, the sensing electrodes are arranged along the second direction, and the first direction intersects a second direction;
wherein each of the driving electrodes receives the touch driving signal.

18. The display terminal as claimed in claim 12, wherein the control electrode layer or the common electrode layer comprises a plurality of touch electrodes that are patterned and arranged in array, and each of the touch electrodes receives the touch driving signal.

19. The display terminal as claimed in claim 12, wherein the second substrate comprises a display area and a binding area on one side of the display area, and a first driving chip is disposed in the binding area;
wherein when the display panel works in the touch mode, the control electrode layer receives the touch driving signal, and the first driving chip is used to output the first display signal, the second display signal, and the touch driving signal.

20. The display terminal as claimed in claim 12, wherein the first substrate comprises a display area and a binding area on one side of the display area; a second driving chip is disposed in the binding area; a conductive gold ball is disposed between the first substrate and the second substrate; and wherein when the display panel works in the touch mode, the control electrode layer receives the touch driving signal, and the second driving chip transmits the first display signal, the second display signal, and the touch driving signal to the second substrate through the conductive gold ball.

\* \* \* \* \*